United States Patent
Itou et al.

(10) Patent No.: US 6,233,923 B1
(45) Date of Patent: May 22, 2001

(54) EXHAUST EMISSION CONTROL DEVICE OF INTERNAL COMBUSTION ENGINE

(75) Inventors: Hidetoshi Itou; Hideaki Takahashi; Kimiyoshi Nishizawa, all of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/532,325

(22) Filed: Mar. 21, 2000

(30) Foreign Application Priority Data

Mar. 25, 1999 (JP) .................................................. 11-081621

(51) Int. Cl.$^7$ ....................................................... F01N 3/00
(52) U.S. Cl. ................................. 60/277; 60/285; 60/295; 60/301
(58) Field of Search ............................... 60/277, 285, 295, 60/301

(56) References Cited

U.S. PATENT DOCUMENTS

| | | | |
|---|---|---|---|
| 5,433,074 | * 7/1995 | Seto et al. ............................... | 60/285 |
| 5,577,382 | * 11/1996 | Kihara et al. ............................ | 60/277 |
| 5,715,679 | * 2/1998 | Asanuma et al. ........................ | 60/285 |
| 5,974,788 | * 11/1999 | Hepburn et al. ......................... | 60/285 |
| 5,974,791 | * 11/1999 | Hirota et al. ............................ | 60/276 |
| 6,014,859 | * 1/2000 | Yoshizaki et al. ....................... | 60/285 |
| 6,089,017 | * 7/2000 | Ogawa et al. ............................ | 60/285 |
| 6,105,365 | * 8/2000 | Deeba et al. ............................. | 60/295 |
| 6,128,899 | * 10/2000 | Oono et al. .............................. | 60/285 |
| 6,138,453 | * 10/2000 | Sawada et al. .......................... | 60/277 |
| 6,141,960 | * 11/2000 | Takami et al. ........................... | 60/285 |
| 6,161,377 | * 12/2000 | Boegner et al. ......................... | 60/285 |

FOREIGN PATENT DOCUMENTS

| | | |
|---|---|---|
| 0580389 | * 1/1994 | (EP) . |
| 10-54274 | 2/1998 | (JP) . |

* cited by examiner

*Primary Examiner*—Thomas Denion
*Assistant Examiner*—Diem Tran
(74) *Attorney, Agent, or Firm*—Foley & Lardner

(57) ABSTRACT

A primary deterioration diagnosis of a front catalyst (8) is performed based on the air-fuel ratio of the exhaust gas downstream of the front catalyst (8) detected in a first period each time the first period elapses when the engine (1) is running in a diagnosis region. A secondary deterioration diagnosis of the front catalyst (8) is performed based on the air-fuel ratio of the exhaust gas downstream of the front catalyst (8) detected in a second period longer than the first period each time the second period elapses when the engine (1) is running in the diagnosis region. When SOx discharge control is performed, primary diagnosis and secondary diagnosis are prohibited, and if it is determined in the primary diagnosis that the front catalyst (8) has deteriorated, SOx discharge control is prohibited to provide an opportunity for secondary diagnosis. In this way, the deterioration diagnosis of the front catalyst (8) can be precisely performed even if there are few opportunities for diagnosis due to lean air-fuel ratio running or SOx discharge control.

11 Claims, 9 Drawing Sheets

EXHAUST EMISSION CONTROL DEVICE OF INTERNAL COMBUSTION ENGINE

FIELD OF THE INVENTION

The present invention relates to an exhaust emission control device of an internal combustion engine.

BACKGROUND OF THE INVENTION

Fuel economy improves if an internal combustion engine is run at a lean air-fuel ratio, but during lean running, the NOx in the exhaust gas increases. Therefore, a NOx storage catalyst is used as exhaust catalyst for an engine which performs lean air-fuel ratio running.

The NOx storage catalyst traps and stores NOx contained in the exhaust gas when the engine is running at a lean air-fuel ratio. When the engine is run at a rich or stoichiometric air-fuel ratio, the stored NOx is reduced by components in the exhaust gas such as HC (hydrocarbons) and CO.

However, SOx (sulfur oxides) in the exhaust gas are also trapped and stored by this NOx storage catalyst. Therefore, the ability of the NOx storage catalyst to trap NOx falls if the amount of stored SOx increases (SOx poisoning).

In Tokkai Hei 10-54274 published by the Japanese Patent Office in 1998, when the amount of SOx stored in the NOx storage catalyst increases and NOx trapping performance declines, a misfire is caused at a lean air-fuel ratio for a predetermined time, and unburnt fuel is supplied to the NOx storage catalyst. By burning this unburnt fuel on the catalyst or by retarding ignition time to increase the exhaust gas temperature, the catalyst temperature is increased, and the stored SOx is thereby discharged.

SUMMARY OF THE INVENTION

Even in an engine which runs at a lean air-fuel ratio, the engine is usually operated at a stoichiometric air-fuel ratio outside a predetermined region, so a three-way catalyst must be provided in addition to the NOx storage catalyst.

The most common method of diagnosing the deterioration of the three-way catalyst is to measure its oxygen storage performance. The oxygen storage performance is for example determined by measuring the change of air-fuel ratio downstream of the three-way catalyst when the air-fuel ratio of the exhaust flowing into the three-way catalyst is made to periodically fluctuate between rich and lean around the stoichiometric air-fuel ratio. For this reason, deterioration diagnosis of the three-way catalyst is performed while running at the stoichiometric air-fuel ratio.

However, if the range in which lean air-fuel ratio running is performed is set wide in order to improve fuel economy, the range in which deterioration diagnosis of the three-way catalyst is possible will become narrow, and opportunities to make a diagnosis will decrease.

Moreover, as the amounts of unburnt fuel and oxygen in the exhaust gas are increased and exhaust gas temperature is raised while performing SOx discharge control, a precise deterioration diagnosis cannot be made and this also reduces diagnostic opportunities.

It is therefore an object of this invention to permit a precise deterioration diagnosis of a three-way catalyst, even when diagnostic opportunities have decreased due to lean air-fuel ratio running or SOx discharge control.

In order to achieve above object, this invention provides an exhaust emission control device of an engine, comprising an exhaust pipe, a front three-way catalyst provided in the exhaust pipe, a rear catalyst provided downstream of the front three-way catalyst which traps or reduces NOx according to an air-fuel ratio of the inflowing exhaust gas, a sensor which detects the air-fuel ratio of the exhaust gas downstream of the front three-way catalyst, a sensor which detects the running state of the engine, and a microprocessor. The microprocessor is programmed to determine whether or not conditions are satisfied for discharging SOx stored in the rear catalyst, perform SOx discharge control of the rear catalyst when conditions are satisfied for discharging SOx and the running state of the engine is within an SOx discharge running region, cause the air-fuel ratio of the engine to fluctuate periodically between rich and lean around the stoichiometric air-fuel ratio when the running state of the engine is in a catalyst diagnosis region whereof part overlaps with the SOx discharge running region, perform a primary diagnosis of whether or not the front three-way catalyst has deteriorated based on the air-fuel ratio of the exhaust gas downstream of the front three-way catalyst detected in a first period each time the first period elapses when the engine is running in the diagnosis region, and perform a secondary diagnosis of whether or not the front three-way catalyst has deteriorated based on the air-fuel ratio of the exhaust gas downstream of the front catalyst detected in a second period longer than the first period each time the second period elapses when the engine is running in the diagnosis region. The microprocessor is further programmed to prohibit the primary diagnosis and second diagnosis when SOx discharge control is performed, and prohibit SOx discharge control when it is diagnosed that the front three-way catalyst has deteriorated in the primary diagnosis.

According to an aspect of this invention, this invention provides an exhaust emission control device of an engine, comprising an exhaust pipe, a three-way catalyst provided in the exhaust pipe which traps or reduces NOx according to an air-fuel ratio of the inflowing exhaust gas, a sensor which detects the air-fuel ratio of the exhaust gas downstream of the three-way catalyst, a sensor which detects the running state of the engine, and a microprocessor. The microprocessor is programmed to determine whether or not conditions are satisfied for discharging SOx stored in the three-way catalyst, perform SOx discharge control of the three-way catalyst when conditions are satisfied for discharging SOx and the running state of the engine is within a SOx discharge running region, cause the air-fuel ratio of the engine to fluctuate periodically between rich and lean around the stoichiometric air-fuel ratio when the running state of the engine is in a catalyst diagnosis region whereof part overlaps with the SOx discharge running region, perform a primary diagnosis of whether or not the three-way catalyst has deteriorated based on the air-fuel ratio of the exhaust gas downstream of the three-way catalyst detected in a first period each time the first period elapses when the engine is running in the diagnosis region, and perform a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region. The microprocessor is further programmed to prohibit the primary diagnosis and secondary diagnosis when SOx discharge control is performed, and prohibit SOx discharge control when it is diagnosed that the three-way catalyst has deteriorated in the primary diagnosis.

According to another aspect of this invention, this invention provides an exhaust emission control device of an engine, comprising an exhaust pipe, a three-way catalyst provided in the exhaust pipe, a sensor which detects the air-fuel ratio of the exhaust gas downstream of the three-way catalyst, a sensor which detects the running state of the engine, and a microprocessor. The microprocessor is programmed to control the air-fuel ratio of the engine to a lean value when the running state of the engine is in a lean air-fuel ratio running region, cause the air-fuel ratio of the engine to fluctuate periodically between rich and lean around the stoichiometric air-fuel ratio when the running state of the engine is in a catalyst diagnosis region and lean air-fuel ratio control is not being performed, perform a primary diagnosis of whether or not the three-way catalyst has deteriorated based on the air-fuel ratio of the exhaust gas downstream of the three-way catalyst detected in a first period each time the first period elapses when the engine is running in the diagnosis region, and perform a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region. The microprocessor is further programmed to prohibit the primary diagnosis and second diagnosis when lean air-fuel ratio control is performed, and prohibit lean air-fuel ratio control when it is diagnosed that the three-way catalyst has deteriorated in the primary diagnosis.

According to yet another aspect of this invention, this invention provides an exhaust emission control device of an engine, comprising: an exhaust pipe, a three-way catalyst provided in the exhaust pipe, a sensor which detects the air-fuel ratio of the exhaust gas downstream of the three-way catalyst, a sensor which detects the running state of the engine, and a microprocessor. The microprocessor is programmed to control the air-fuel ratio of the engine to a lean air-fuel ratio when the running state of the engine is in a lean air-fuel ratio running region, cause the air-fuel ratio of the engine to fluctuate periodically between rich and lean around the stoichiometric air-fuel ratio with preference to lean air-fuel ratio control when the running state of the engine is in a catalyst diagnosis region, perform a primary diagnosis of whether or not the three-way catalyst has deteriorated based on the air-fuel ratio of the exhaust gas downstream of the three-way catalyst detected in a first period each time the first period elapses when the engine is running in the diagnosis region, and perform a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region. The microprocessor is further programmed to set the diagnosis region outside the lean air-fuel ratio running region until it is determined in the primary diagnosis that the front catalyst has deteriorated, and after it is diagnosed as having deteriorated, enlarge the diagnosis region to a region overlapping with the lean air-fuel ratio running region.

The details as well as other features and advantages of this invention are set forth in the remainder of the specification and are shown in the accompanying drawings.

DESCRIPTION OF THE PREFERRED EMBODIMENTS

Figure 1:
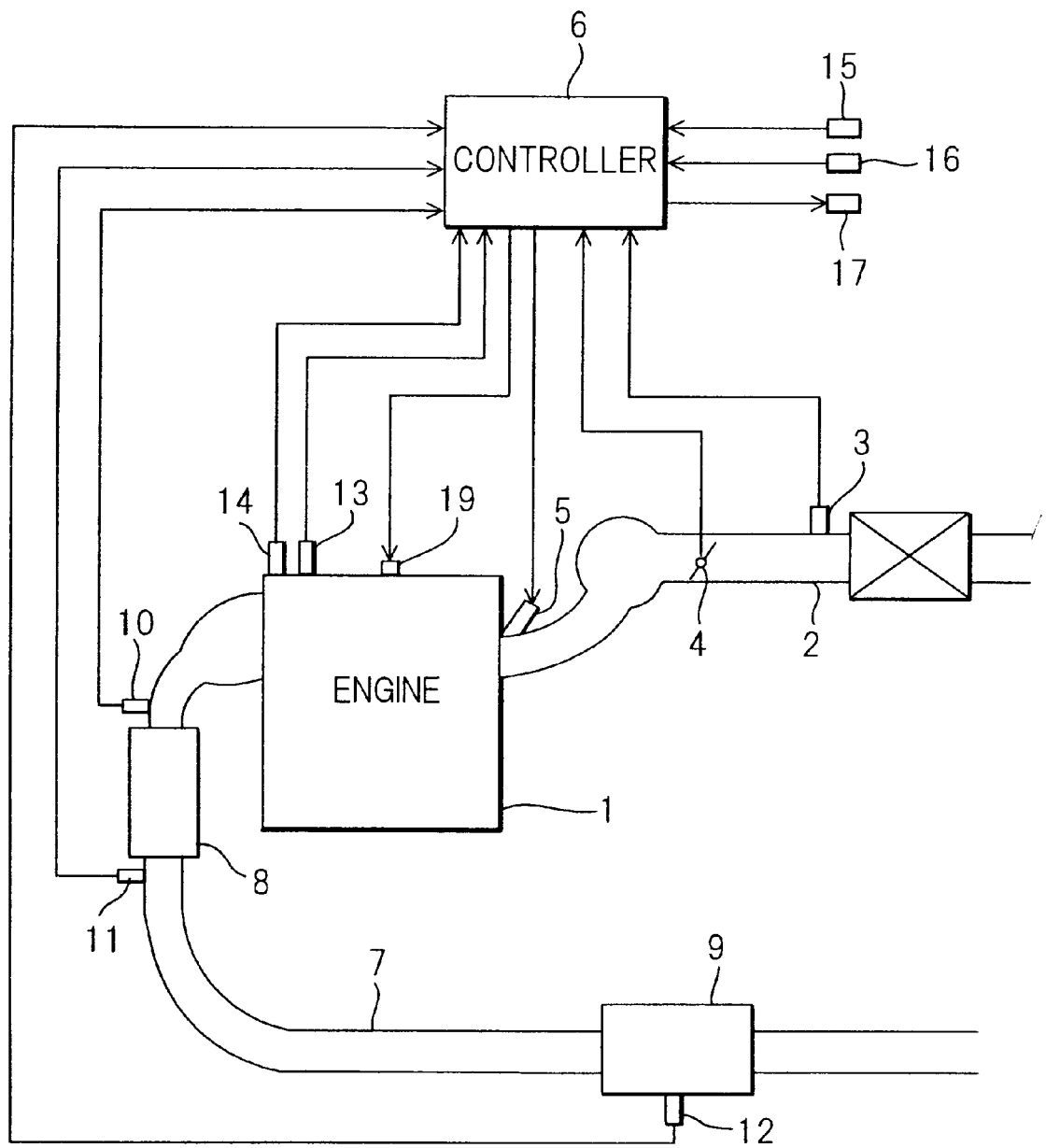
FIG. 1 is a schematic view of an exhaust emission control device according to this invention.

Referring to FIG. 1 of the drawings, an air flow meter 3 which detects an intake air amount, a throttle 4 which adjusts the intake air amount, and an injector 5 which injects fuel into an intake pipe 2, are situated in the intake pipe 2 of an internal combustion engine 1. The injector 5 may inject fuel directly into a cylinder of the engine 1.

A front catalyst 8 is formed in an exhaust pipe 7 of the engine 1, and a rear catalyst 9 is formed downstream of the front catalyst 8.

The front catalyst 8 is a three-way catalyst, and reduces NOx in the exhaust gas and oxidizes HC and CO with maximum transformation efficiency when the engine 1 is running at the stoichiometric air-fuel ratio.

The rear catalyst 9 is also a three-way catalyst, and it traps or reduces NOx according to the air-fuel ratio of inflowing exhaust. The rear catalyst 9 traps and stores NOx generated while the engine 1 is running at a lean air-fuel ratio. When the engine 1 is run at a rich or stoichiometric air-fuel ratio and the oxygen concentration of the exhaust gas is reduced, the rear catalyst 9 reduces the stored NOx by HC and CO in the exhaust gas.

A front $O_2$ sensor 10 and rear $O_2$ sensor 11 are provided respectively upstream and downstream of the front catalyst 8. The front $O_2$ sensor 10 and rear $O_2$ sensor 11 can detect whether the air-fuel ratios of the exhaust gas flowing into the front catalyst 8, and the exhaust flowing out of the front catalyst 8, are richer or leaner than the stoichiometric air-fuel ratio.

A catalyst temperature sensor 12 which detects the temperature is also provided in the rear catalyst 9.

In addition to signals from the above-mentioned air flow meter 3, $O_2$ sensors 10 and 11, and the catalyst temperature sensor 12, a cooling water temperature signal from a cooling water temperature sensor 13, a Ref signal and Pos signal from a crank angle sensor 14, an accelerator depression amount signal from an accelerator position sensor 15, and a vehicle speed signal from a vehicle speed 16, are input into a controller 6. The controller 6 controls the throttle 4, injector 5 and spark plug 19 based on these various signals.

If the amount of SOx stored in the rear catalyst 9 increases and NOx trapping performance declines, the controller 6 performs SOx discharge control under predetermined conditions and increases the temperature of the rear catalyst 9 to discharge the stored SOx.

Furthermore, as the temperature of the front catalyst 8 is also increased and the front catalyst 8 may deteriorate due to heat if SOx discharge control is performed, the controller 6 also performs the diagnosis of whether the front catalyst 8 has deteriorated based on the output of the $O_2$ sensors 10 and 11.

Figure 2A:
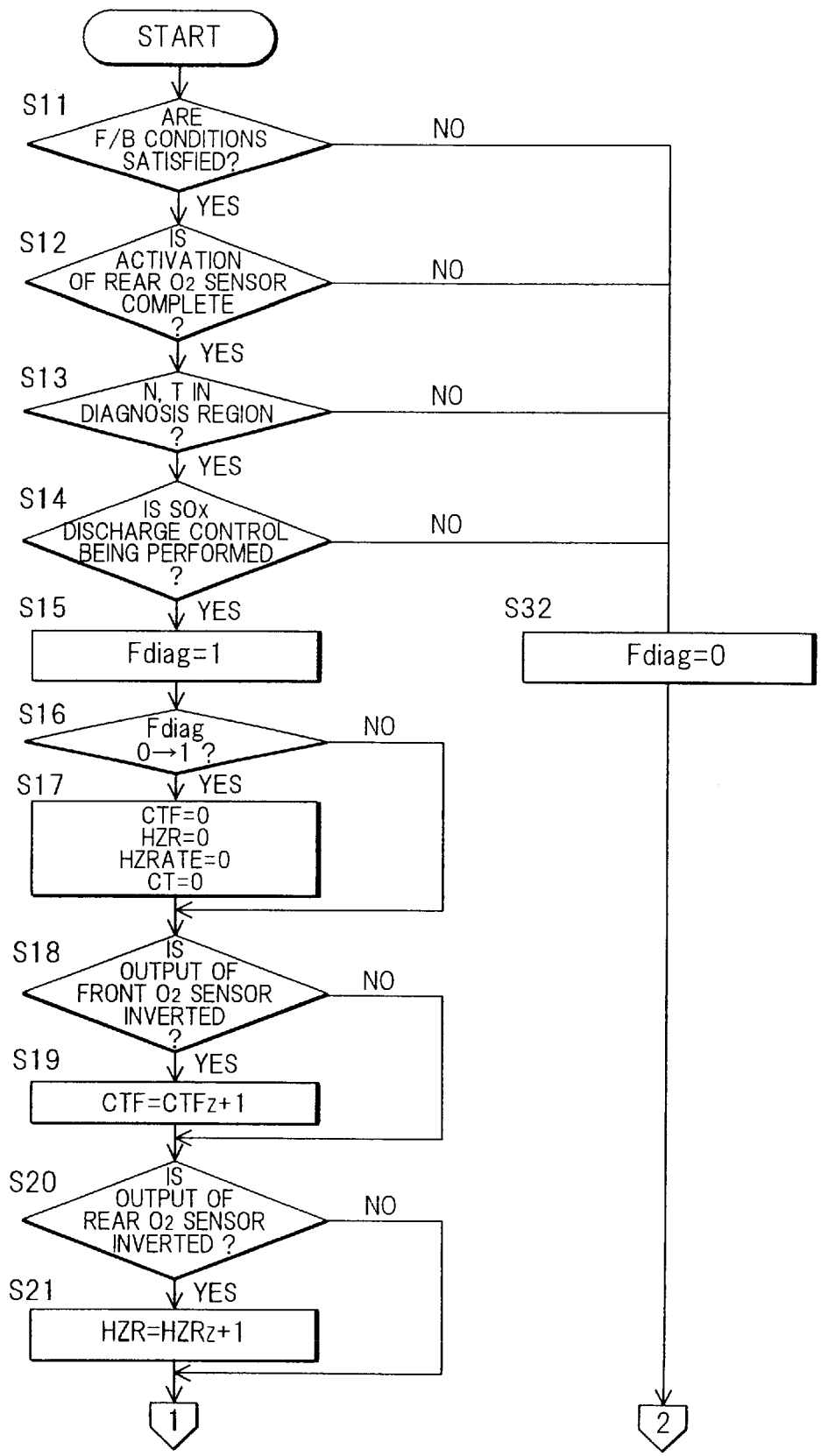
FIG. 2a shows a first half of a routine for deterioration diagnosis.
Figure 2B:
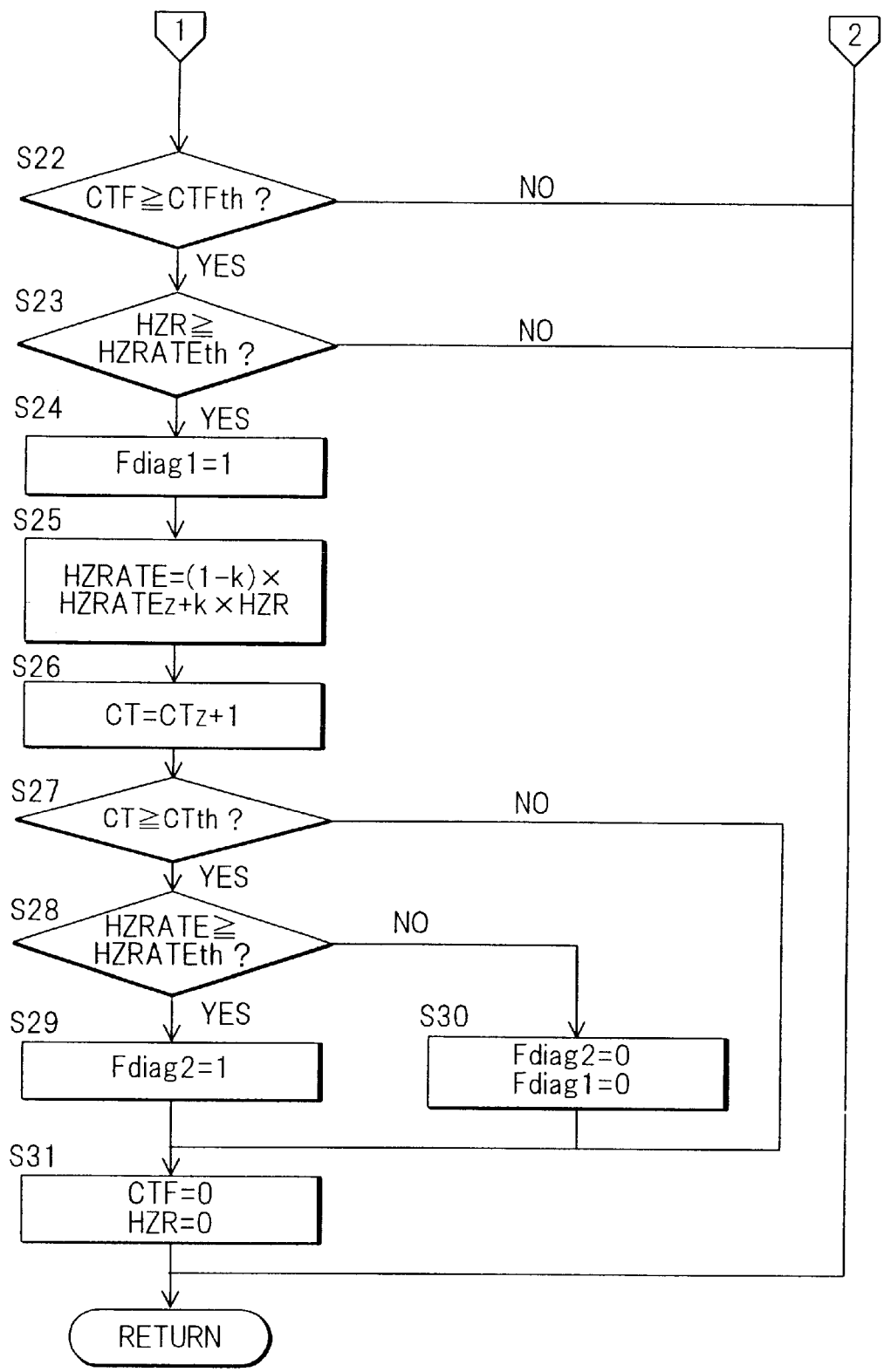
FIG. 2b shows a second half of a routine for deterioration diagnosis.

FIG. 2a and FIG. 2b show a routine for determining whether the front catalyst 8 has deteriorated. This routine is performed by the controller 6 at a predetermined interval, for example 10 milliseconds.

This routine diagnoses the deterioration of the front catalyst 8 based on the output of the front $O_2$ sensor 10 and the output of rear $O_2$ sensor 11, and set flags Fdiag1 and Fdiag2 according to the diagnosis result.

First, in a step S11, it is determined whether or not the air-fuel ratio feedback control conditions (hereafter, F/B conditions) are satisfied.

F/B conditions are satisfied when the following conditions are all satisfied.

Activation of the front $O_2$ sensor 10 is complete.

Fuel increase amount control immediately after engine startup is completed (fuel increase correction coefficient COEF=1).

The target air-fuel ratio is the stoichiometric air-fuel ratio (target equivalence ratio TFBYA=1).

When it is determined that F/B conditions are satisfied, the air-fuel ratio of the gaseous mixture supplied to the engine 1 is feedback controlled to the stoichiometric air-fuel ratio based on the output of the front $O_2$ sensor 10, and the routine proceeds to a step S12. As the air-fuel ratio of the exhaust flowing into the front catalyst 8 periodically fluctuates between rich and lean around the stoichiometric air-fuel ratio at this time, if the $O_2$ storage performance of the front catalyst 8 is measured based on the output of the rear $O_2$ sensor 11, the deterioration of the front catalyst 8 can be diagnosed.

On the other hand, when it is determined that F/B conditions are not satisfied, the routine proceeds to a step S32, the flag Fdiag is set to zero showing that deterioration diagnosis is not performed, and the routine is terminated.

In a step S12, it is determined whether or not the activation of the rear $O_2$ sensor 11 is complete. When it is determined that the activation of the rear $O_2$ sensor 11 is complete, the routine proceeds to a step S13. In other cases, the routine proceeds to a step S32, the flag Fdiag is set to zero, and the routine is terminated.

Figure 3:
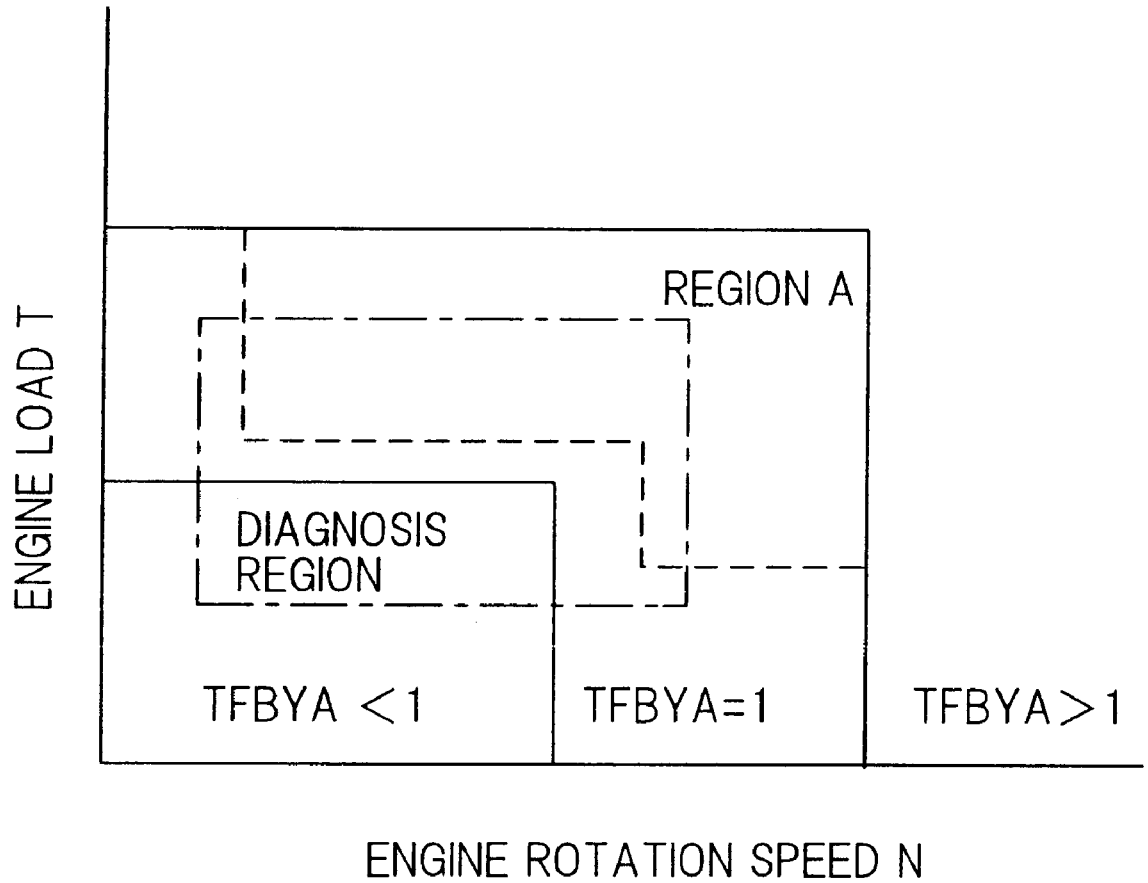
FIG. 3 is a map for setting a target equivalence ratio.

In the step S13, it is determined whether or not the engine rotation speed N and engine load T are in a region (hereafter, "diagnosis region") enclosed by the dot-and-dash line in FIG. 3. The diagnosis region is set as a region where the engine 1 frequently runs in the steady state. Here, it is determined whether or not the engine rotation speed N and engine load T are in the diagnosis region, but it may additionally be determined whether or not the fluctuation of engine rotation speed N and engine load T are within predetermined limits. When it is determined that the engine rotation speed N and engine load T are within the diagnosis region, the routine proceeds to a step S14, otherwise it proceeds to the step S32, the flag Fdiag is set to zero, and the routine is terminated.

In the step S14, it is determined whether or not SOx discharge control is being performed. When it is determined that SOx discharge control is not currently being performed, the routine proceeds to a step S15 to perform deterioration diagnosis, and the flag Fdiag is set to 1 showing that deterioration diagnosis of the front catalyst 8 is currently being performed. In other cases, the routine proceeds to the step S32, the flag Fdiag is set to zero, and the routine is terminated.

The reason why a deterioration diagnosis is not performed during SOx discharge control is because, during SOx discharge control, the amount of unburnt fuel components and the oxygen amount flowing into the catalyst may increase, or the control midpoint of air-fuel feedback control may change to rich, so it is difficult to perform a precise deterioration diagnosis.

In a step S16, it is determined whether it is immediately after starting deterioration diagnosis based on the change of the flag Fdiag. If the flag Fdiag was zero on the immediately preceding occasion the routine was performed and the flag Fdiag is 1 on the present occasion, it is determined that diagnostic conditions have just been satisfied. When it is determined that diagnosis has just started, the routine proceeds to a step S17, otherwise the routine proceeds to a step S18.

In a step S17, the variables CTF, HZR, HZRATE and CT used for deterioration diagnosis are initialized. CTF is a counter which counts the number of inversions of the output of the front $O_2$ sensor 10, HZR is a counter which counts the number of inversions of the output of the rear $O_2$ sensor 11, HZRATE is the ratio of numbers of inversions of the outputs of the rear/front $O_2$ sensors which expresses the degree of deterioration of the front catalyst 8, and CT is a counter which counts the number of weighted average computations of HZRATE.

In a step S18, it is determined whether the output of the front $O_2$ sensor 10 has crossed a threshold value which corresponds to the stoichiometric air-fuel ratio. When it is determined that the output of the front $O_2$ sensor 10 has crossed the threshold value, the routine proceeds to a step S19 and CTF is counted, otherwise the routine proceeds to a step S20. The letter z in the flowchart represents the value on the immediately preceding occasion (same hereafter).

In a step S20, it is determined whether the output of the rear $O_2$ sensor 11 has crossed a threshold value which corresponds to the stoichiometric air-fuel ratio. When it is determined that the output of the rear $O_2$ sensor 11 has crossed the threshold value, the routine proceeds to a step S21 and HZR is counted, otherwise the routine proceeds to a step S22 of FIG. 2b.

In a step S22, it is determined whether or not CTF has reached a predetermined number of times CTFth. When it is determined that CTF has reached a predetermined number of times CTFth, the routine proceeds to a step S23, otherwise the routine is terminated.

In the step S23, the primary diagnosis of the front catalyst 8 is performed. The number of inversions of the output of rear $O_2$ sensor 11 while the output of front $O_2$ sensor 10 undergoes a predetermined number of inversions represents the $O_2$ storage performance of the front catalyst 8, i.e., since the $O_2$ storage performance decreases as the number of inversions increases, the deterioration of the front catalyst 8 can be diagnosed by comparing HZR with a determination reference value HZRATEth.

Herein, CTFth is set to a value from which a diagnosis result can be obtained even if the time for which deterioration diagnosis conditions are satisfied is short. Although there are a large number of opportunities for diagnosis as the primary diagnosis is performed in a short time, it is on the other hand easily influenced by disturbances such as a change in the running state of engine 1, and is not sufficiently precise.

In a step S24, a flag Fdiag1 is set to 1 showing that the front catalyst 8 is diagnosed as having deteriorated in the primary diagnosis. Once Fdiag1 is set to 1, even if the catalyst is diagnosed as not having deteriorated in the primary diagnosis on the next and subsequent occasions, the determination of deterioration (Fdiag1=1) is maintained.

In a step S25, HZRATE is computed by performing a weighted average calculation of HZR using the formula:

$$\text{HZRATE} = (1-k) \times \text{HZRATEz} + k \times \text{HZR} \quad (1)$$

k is a weighting coefficient and is set to a value between zero and 1.

In a step S26, CT is counted, and in a step S27, it is determined whether or not CT has reached the predetermined number of times CTth. When CT reaches the predetermined number of times CTth, the routine proceeds to a step S28, otherwise this routine is terminated.

In the step S28, the secondary diagnosis of the front catalyst 8 is performed. HZRATE is compared with the determined reference value HZRATEth, and when HZRATE≧HZRATEth, it is determined that the front catalyst 8 has actually deteriorated, and the routine proceeds to a step S29. In this secondary diagnosis, if the diagnosis continues during a period which is CTth times the period during which the output of the front $O_2$ sensor 10 undergoes CTFth inversions, a diagnostic result of sufficient accuracy will be obtained.

In the step S29, a flag Fdiag2 is set to 1 showing that the catalyst has been diagnosed as having deteriorated in the secondary diagnosis. When the catalyst is diagnosed as having deteriorated in the secondary diagnosis, a warning light 17 is turned on to alert the driver.

On the other hand, when HZRATE>HZRATEth, it is determined that the front catalyst 8 has not deteriorated, the routine proceeds to a step S30, and the flags Fdiag2 and Fdiag1 are set to zero.

In a step S31, CTF and HZR are respectively set to zero in preparation for the next diagnosis.

Therefore, by performing this routine, when SOx discharge control is not performed, primary diagnosis and secondary diagnosis of the front catalyst 8 are performed based on the output of the $O_2$ sensors 10 and 11. When the front catalyst 8 is diagnosed as not having deteriorated in the primary diagnosis, Fdiag1 is set to zero, and when it is diagnosed as having deteriorated, Fdiag1 is set to 1. Likewise, when the front catalyst 8 is diagnosed as not having deteriorated in the secondary diagnosis result, Fdiag2 is set to zero, and when it is diagnosed as having deteriorated, Fdiag2 is set to 1.

Figure 4:
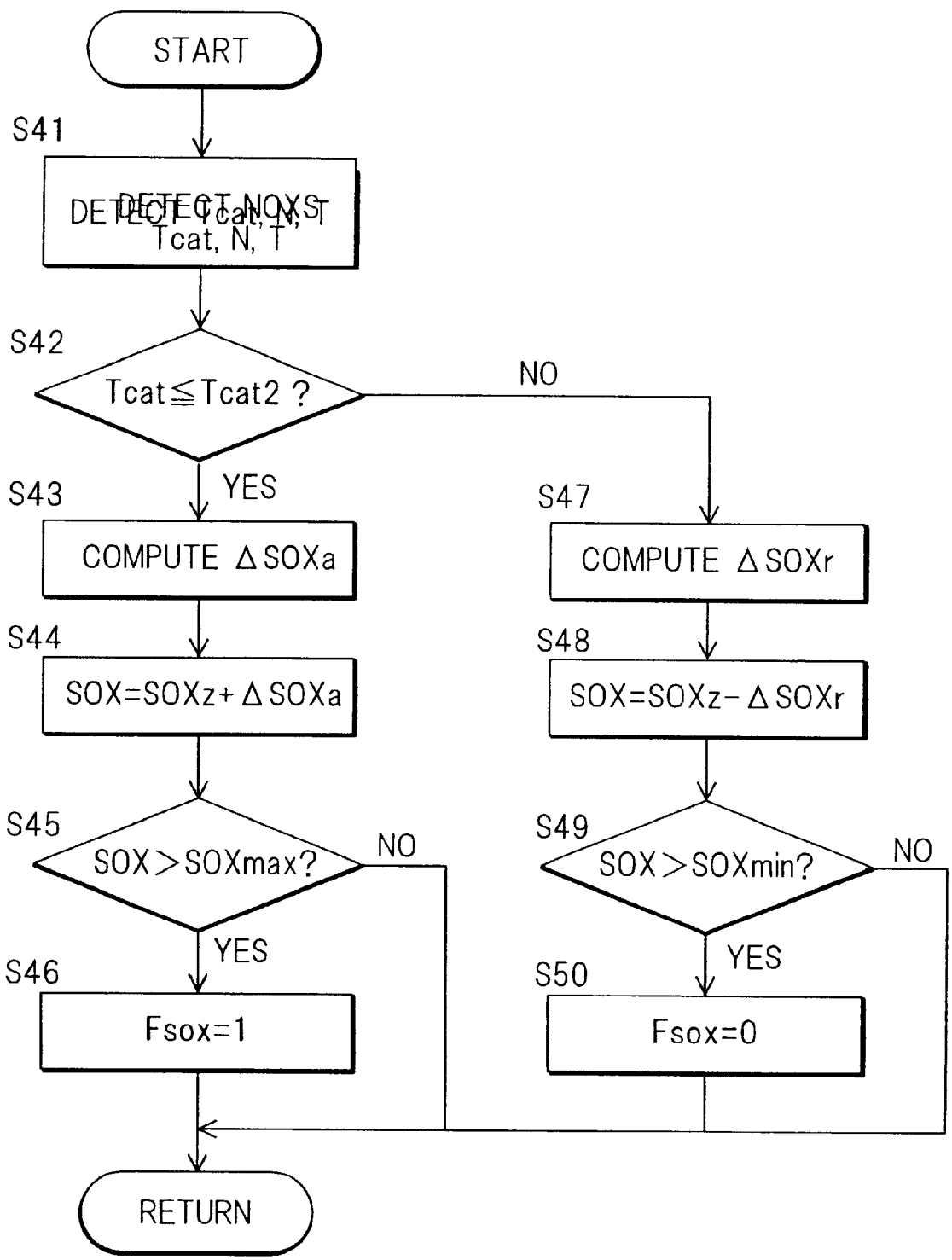
FIG. 4 shows a routine for determining whether or not SOx discharge conditions are satisfied.

FIG. 4 shows a routine for determining whether or not SOx discharge conditions are satisfied. This routine is performed by the controller 6 at a predetermined interval, for example 10 milliseconds.

This routine estimates the SOx amount stored in the rear catalyst 9. Based on the estimated SOx storage amount, it is determined whether or not SOx discharge conditions are satisfied, and a flag Fsox is set.

First, in a step S41, the output of the catalyst temperature sensor 12 is A/D converted, and the catalyst temperature Tcat of the rear catalyst 9 is detected. The engine rotation speed N is calculated based on a recurrence interval of a signal (for example, Ref signal) from the crank angle sensor 14. An engine load T (for example, target torque of the engine 1 according to an accelerator depression amount) is also calculated based on the output of the accelerator position sensor 15. The catalyst temperature Tcat may be estimated based on engine running conditions.

In a step S42, it is determined whether or not the catalyst temperature Tcat is lower than an SOx discharge temperature Tcat2. When the catalyst temperature Tcat is less than the SOx discharge temperature Tcat2, it is determined that conditions for the rear catalyst 9 to trap SOx are satisfied, and the routine proceeds to a step S43. On the other hand, when the catalyst temperature Tcat is higher than the SOx discharge temperature Tcat2, it is determined that conditions for the rear catalyst 9 to discharge SOx are satisfied, and the routine proceeds to a step S47.

In the step S43, the SOx amount trapped in a predetermined time (here 10 milliseconds) by the rear catalyst 9 is computed by the following equation:

$$\Delta\text{SOXa} = (\text{SOx amount which flows into the rear catalyst 9 in a predetermined time}) \times (\text{SOx trapping rate of rear catalyst 9}) \quad (2)$$

The SOx amount which flows into the rear catalyst 9 in a predetermined time is computed based on, for example, the engine rotation speed N, engine load T and average air-fuel ratio. The SOx trapping rate of the rear catalyst 9 (SOx amount trapped per unit time/SOx amount flowing in per unit time) is computed based on, for example, a present SOx storage amount SOXz (estimated value of SOx storage amount computed on the immediately preceding occasion), catalyst temperature Tcat and average air-fuel ratio. A target equivalence ratio TFBYA set by a routine described later may be used as the average air-fuel ratio.

The SOx trapping rate of the rear catalyst 9 is a value ranging from zero to 1, and has the following characteristics.

The SOx trapping rate increases as the SOx storage amount SOX of the rear catalyst 9 decreases. When the SOx storage amount SOX is zero, the SOx trapping rate is a maximum.

The SOx trapping rate is a maximum when the temperature Tcat of the rear catalyst 9 is a predetermined temperature, is smaller when the temperature is lower than the predetermined temperature, and is zero below the catalyst activation temperature. The SOx trapping rate decreases even at a temperature higher than the predetermined temperature, and is zero above the SOx discharge temperature Tcat2.

The SOx trapping rate decreases as the degree of leanness decreases, and is zero at a rich air-fuel ratio.

When the SOx amount $\Delta\text{SOXa}$ trapped in a predetermined time has been computed, the routine proceeds to a step S44.

In the step S44, $\Delta\text{SOXa}$ is added to the estimated SOx storage amount SOXz computed on the immediately preceding occasion, and the newest estimated SOx storage amount SOX is computed.

In a step S45, it is determined whether or not the estimated SOx storage amount SOX is larger than a predetermined amount SOXmax. When the estimated SOx storage amount SOX is greater than the predetermined amount SOXmax, the routine proceeds to a step S46, and a flag Fsox is set to 1 showing that SOx discharge conditions are satisfied. The predetermined amount SOXmax is set so that a predetermined NOx storage capacity NOXth remains in the rear catalyst 9.

On the other hand, in a step S47, an SOx amount $\Delta\text{SOXr}$ discharged from the rear catalyst 9 in a predetermined time (here 10 milliseconds) is computed by the following equation:

$$\Delta\text{SOXr} = (\text{predetermined time}) \times (\text{SOx discharge rate of rear catalyst 9}) \quad (3)$$

The SOx discharge rate of the rear catalyst 9 is the SOx amount discharged from the rear catalyst 9 per unit time, and is computed based on, for example, the present SOx storage amount SOXz (estimated value of SOx storage amount computed on the immediately preceding occasion), catalyst temperature Tcat and average air-fuel ratio.

The target equivalence ratio TFBYA set by a routine described later is used as the average air-fuel ratio. However, during SOx discharge control, as it may occur that the average air-fuel ratio may be made rich by varying the control center value of air-fuel ratio feedback control while setting TFBYA=1, the degree of richness must also be taken into account.

The SOx discharge rate of the rear catalyst 9 has the following characteristics.

The SOx discharge rate decreases as the SOx storage amount SOX of the rear catalyst 9 decreases. When the SOx storage amount SOX is zero, the SOx discharge rate is zero.

The SOx discharge rate becomes lower, the lower the catalyst temperature Tcat of the rear catalyst 9, and is zero below the SOx discharge temperature Tcat2.

The SOx discharge rate decreases as the degree of richness decreases, and is zero at a lean air-fuel ratio.

After the SOx amount discharged from the rear catalyst ΔSOXr is computed, the routine proceeds to a step S48, and ΔSOXr is subtracted from the estimated SOx storage amount SOXz computed on the immediately preceding occasion to estimate the newest SOx storage amount SOX.

In a step S49, it is determined whether or not the estimated SOx storage amount SOX is smaller than a predetermined value SOXmin. When it is smaller than the predetermined value SOXmin, the routine proceeds to a step S50, and the flag Fsox is set to zero showing that SOx discharge conditions are not satisfied. The predetermined value SOXmin is set to a small value near zero.

Therefore, by performing this routine, the trapped SOx amount ΔSOXa or discharge amount ΔSOXr of the rear catalyst 9 per predetermined time is computed based on the catalyst temperature Tcat, and the SOx storage amount SOX is estimated by accumulating these values.

Once this estimated SOx storage amount SOX exceeds the permitted amount SOXmax, Fsox=1 is maintained until SOx is almost completely discharged. The reason why Fsox=1 is maintained until SOx is almost completely discharged is to prevent frequent starts and stops of SOx discharge control.

The SOx stored in the rear catalyst 9 is stored by the rear catalyst 9 as it is even after the engine 1 stops, so the estimated SOx storage amount SOX remains in the memory of the controller 6 even after the engine stops. It is read as an initial value of the SOx storage amount SOX the next time the engine 1 starts, and is used for subsequent estimations of the SOx storage amount SOX.

Here, the SOx storage amount SOX is estimated by performing a cumulative computation on the SOx trapping amount SOXa and discharge amount SOXr per predetermined time, but this may be simplified. For example, the steps S43, S47 may be omitted and ΔSOXa, ΔSOXr may be taken as fixed values in the steps S44, S48.

Figure 5:
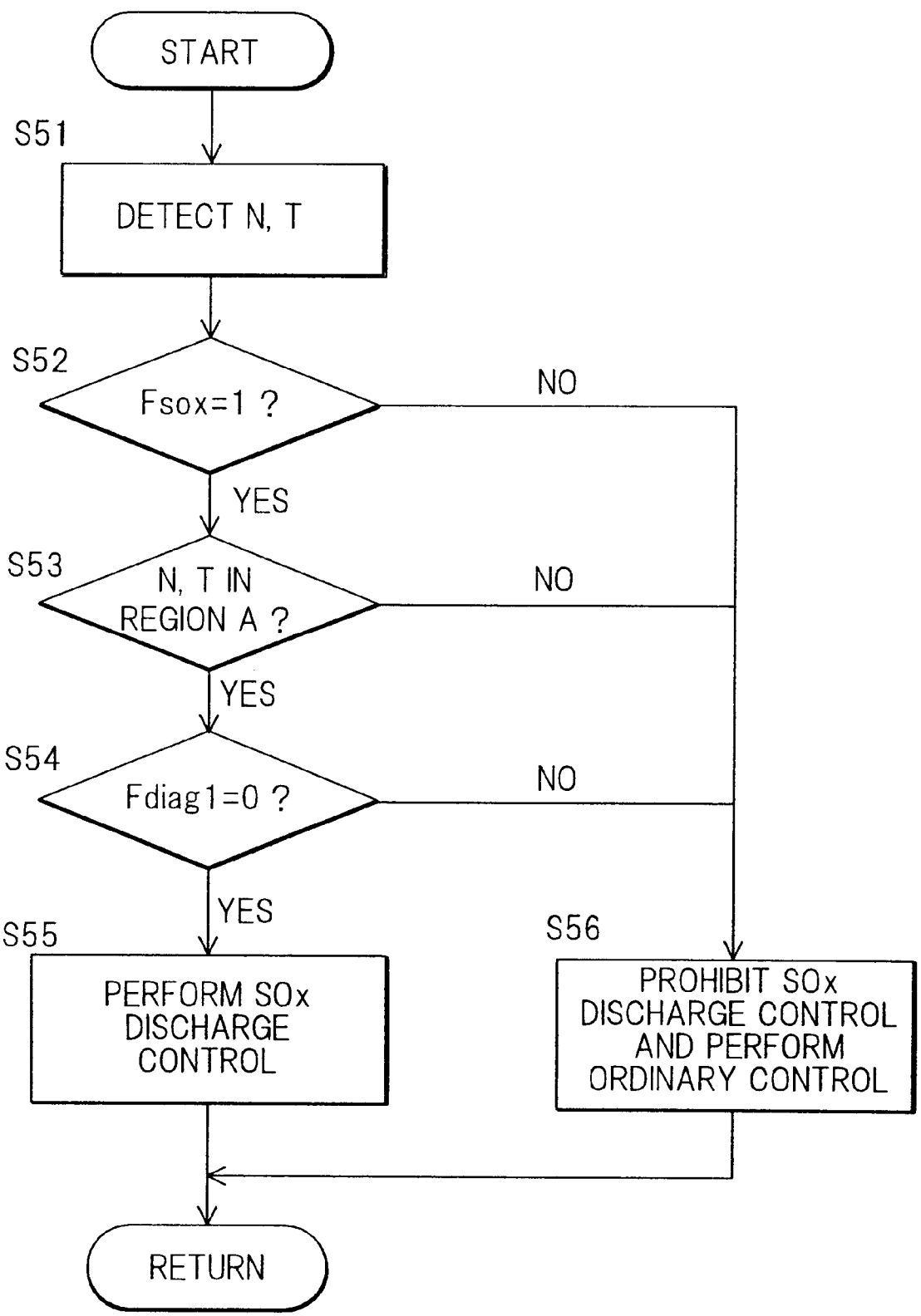
FIG. 5 shows a routine for determining whether SOx discharge control is performed.

FIG. 5 shows the routine for determining whether or not SOx discharge conditions are satisfied. This routine is performed by the controller 6 at a predetermined interval, for example 10 milliseconds.

This routine determines whether or not to perform SOx discharge control of the rear catalyst 9 based on the flag Fdiag1, flag Fsox and catalyst temperature Tcat.

First, in a step S51, the engine rotation speed N is detected based on the recurrence interval of a predetermined signal of the crank angle sensor 14. The engine load T is detected based on the output of the accelerator position sensor 15.

In a step S52, it is determined whether or not conditions for discharging SOx stored in the rear catalyst 9 are satisfied based on the flag Fsox. When the SOX discharge conditions are satisfied (Fsox=1), the routine proceeds to a step S53, otherwise the routine proceeds to a step S56.

In the step S53, it is determined whether or not the engine rotation speed N and engine load T are in an SOx discharge running region by looking up a map shown in FIG. 3. Here, the SOx discharge running region is a region A surrounded by the dotted line of FIG. 3, and it is a region wherein the catalyst temperature Tcat of the rear catalyst 9 can be raised above the SOx discharge temperature Tcat2 when SOx discharge control is performed.

In the step S54, it is determined whether or not the front catalyst 8 is diagnosed as having deteriorated based on the flag Fdiag1. When the flag Fdiag1 is zero, i.e., when the front catalyst 8 is diagnosed as not having deteriorated, the routine proceeds to a step S55 and SOx discharge control is performed.

On the other hand, when the flag Fdiag1 is 1, i.e., when the front catalyst 8 is diagnosed as having deteriorated, the routine proceeds to a step S56, SOx discharge control is prohibited and ordinary control is performed.

Herein, when the flag Fdiag1 is 1, SOx discharge control is prohibited over the whole of the SOx discharge running region, however SOx discharge control may be prohibited only in the region where the SOx discharge running region and diagnosis region overlap.

SOx discharge control is performed for example by increasing the amount of unburnt fuel components and oxygen flowing into the rear catalyst 9, and raising the catalyst temperature above the SOx discharge temperature by burning these unburnt fuel components on the rear catalyst 9. When the catalyst temperature increases, SOx discharge from the rear catalyst 9 is promoted, so the air-fuel ratio becomes rich due to reduction of the discharged SOx.

Therefore, by performing this routine, when SOx discharge conditions are satisfied and it is determined as a result of the primary diagnosis that the front catalyst 8 has not deteriorated, SOx discharge control is performed. Otherwise, SOx discharge control is prohibited, and ordinary control is performed.

Figure 6:
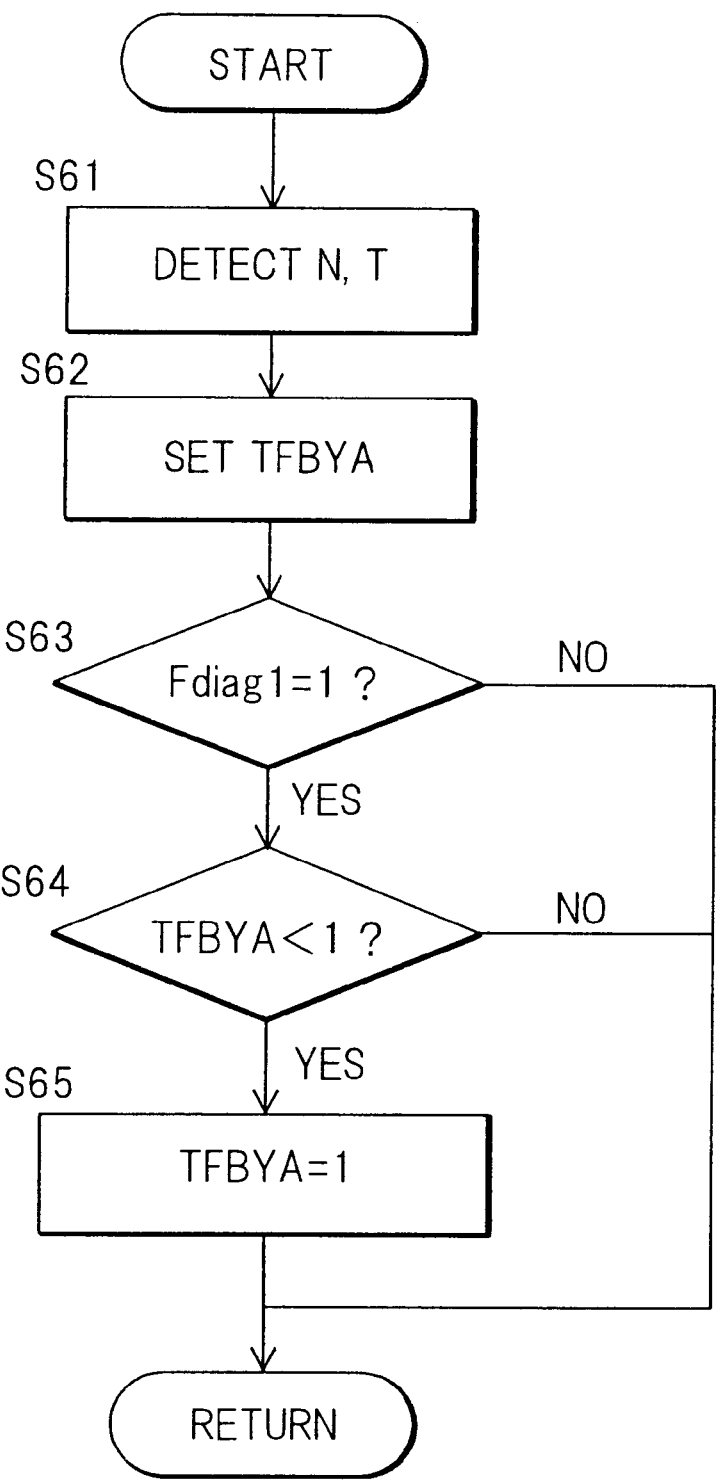
FIG. 6 shows a routine for setting a target air-fuel ratio.

FIG. 6 shows a routine for setting the target air-fuel ratio. This routine is performed at a predetermined interval, for example 10 milliseconds, by the controller 6. This routine sets the target air-fuel ratio (target equivalence ratio) according to the running conditions.

First, in a step S61, the engine rotation speed N is detected based on the occurrence interval of a predetermined signal of the crank angle sensor 14. Also, the engine load T is detected based on the output of the accelerator position sensor 15.

In a step S62, the target equivalence ratio TFBYA is set according to the engine rotation speed N and engine load T by looking up a target equivalence ratio setting map shown in FIG. 3. Here, the target equivalence ratio TFBYA is the ratio of the stoichiometric air-fuel ratio and target air-fuel ratio (stoichiometric air-fuel ratio/target air-fuel ratio). When TFBYA is 1, the air-fuel ratio is the stoichiometric air-fuel ratio, when it is greater that 1, the air-fuel ratio is rich, and when it is less than 1, the air-fuel ratio is lean.

In a step S63, it is determined whether or not the front catalyst 8 is diagnosed as having deteriorated in the primary diagnosis based on the flag Fdiag1. When the front catalyst 8 is diagnosed as having deteriorated, the routine proceeds to a step S64, otherwise the routine is terminated.

In the step S64, it is determined whether or not the target equivalence ratio TFBYA is smaller than 1, and when TFBYA is less than 1, the routine proceeds to a step S65 and TFBYA is set to 1.

Therefore, by performing this routine, the target equivalence ratio TFBYA is set according to the running conditions. In a running region where TFBYA is set smaller than 1, lean air-fuel ratio running is normally performed. However, when the front catalyst 8 is diagnosed as having deteriorated in the primary diagnosis, lean air-fuel ratio running is prohibited, the vehicle is run at the stoichiometric air-fuel ratio, and opportunities for diagnosing the front catalyst 8 are maintained.

Herein, when the flag Fdiag1 is 1, lean air-fuel ratio running is prohibited over the whole of the lean air-fuel ratio running region, however lean air-fuel ratio running may be prohibited only in the region where the lean air-fuel ration running region and diagnosis region overlap.

The target equivalence ratio TFBYA set here is used for computing fuel injection amount in a routine described later, and also in various other routines as a representative value of air-fuel ratio.

Figure 7:
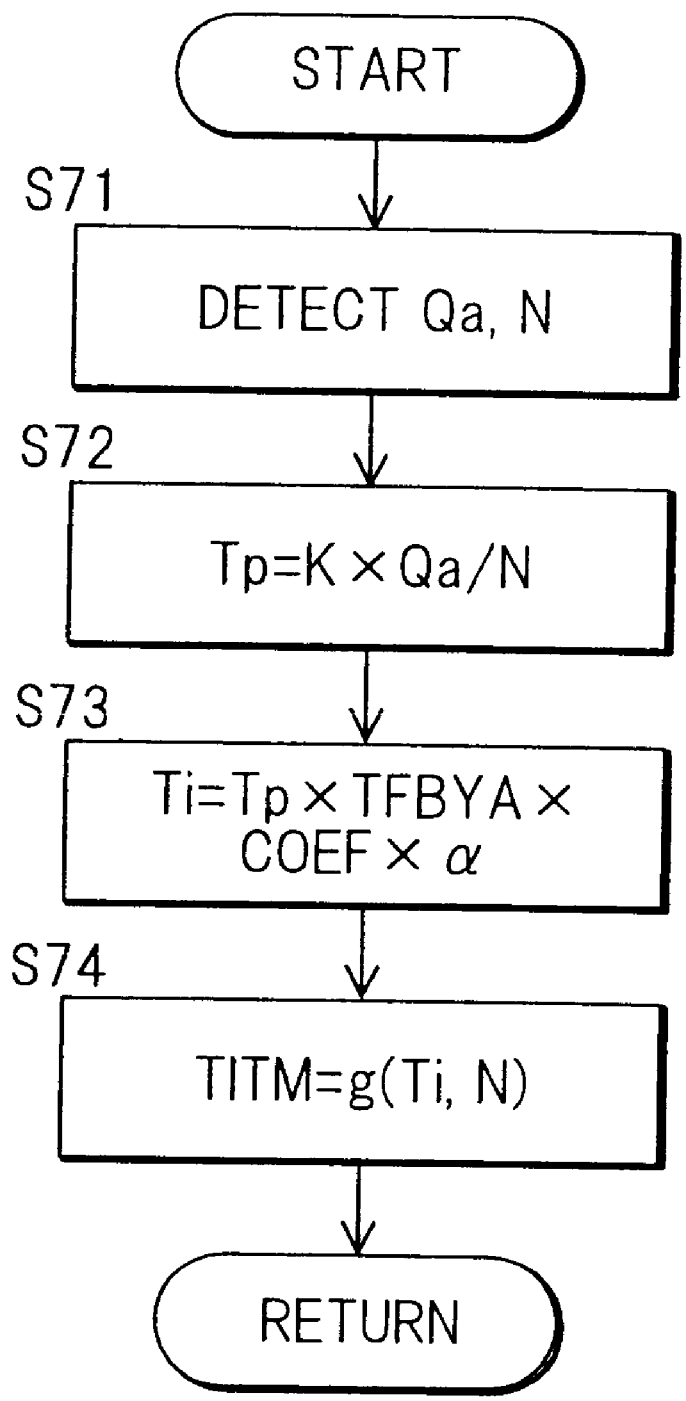
FIG. 7 shows a routine for computing a fuel injection amount and injection timing.

FIG. 7 shows a routine for computing the fuel injection amount and fuel injection timing. This routine is performed by the controller 6 at a predetermined interval, for example 10 milliseconds.

In a step S71, an intake air amount Qa is detected based on the output of the air flow meter 3. The engine rotation speed N is detected based on the occurrence interval of a predetermined signal from the crank angle sensor 14.

In a step S72, a basic fuel injection amount Tp, i.e., a fuel amount corresponding to the stoichiometric air-fuel ratio, is computed based on the intake air amount Qa and the engine rotation speed N.

$$Tp = K \times Qa/N \qquad (4)$$

where K is a predetermined constant.

In a step S73, Tp is corrected by the target equivalence ratio TFBYA, a fuel increase correction coefficient COEF and a fuel ratio feedback α, and a fuel injection amount Ti is computed by the following equation:

$$Ti = Tp \times TFBYA \times COEF \times \alpha \qquad (5)$$

The fuel increase correction coefficient COEF collectively represents a fuel increase correction coefficient after startup and a water temperature increase correction coefficient. The fuel increase correction coefficient COEF is larger than 1 until warmup of the engine 1 is complete, but after warmup of the engine 1 is completed, it is 1. Also, the fuel ratio feedback correction coefficient α is an air-fuel ratio feedback correction coefficient when the target equivalence ratio TFBYA is set to 1 and the air-fuel ratio is feedback controlled to the stoichiometric air-fuel ratio. It is computed according to the output of the front $O_2$ sensor 10.

In a step S74, a fuel injection timing TITM is computed based on the fuel ignition amount Ti and engine rotation speed N. The computed fuel injection amount Ti and fuel injection timing TITM are stored in the memory of the controller 6, and read and used in a fuel injection routine performed is synchronism with the rotation of the engine 1. For example, a signal is output to the injector 5 so that a fuel amount obtained by adding an ineffectual injection amount Ts to the fuel injection amount Ti is injected at a crank angle determined by the fuel injection timing TITM.

In this embodiment, stratified charge combustion is performed when running at a lean air-fuel ratio, and uniform charge combustion is performed when running at the stoichiometric air-fuel ratio or a rich air-fuel ratio. For this reason, when running at a lean air-fuel ratio, the fuel injection timing TITM is set in the compression stroke. When running at the stoichiometric air-fuel ratio or a rich air-fuel ratio, the fuel injection timing TITM is set in the intake stroke.

Next, the operation of the exhaust emission control device will be described when the controller 6 performs the above routine.

In the above exhaust emission control device, when the vehicle is run at the stoichiometric air-fuel ratio, CO, HC and NOx contained in the exhaust gas from the engine 1 are effectively purified by the front catalyst 8. When the engine 1 is running at a lean air-fuel ratio, the amount of NOx passing through the front catalyst 8 without purification increases, but NOx which has passed through the front catalyst 8 is trapped and stored by the rear catalyst 9.

However, as SOx in the exhaust gas is also trapped and stored by the rear catalyst 9, when the SOx amount stored in the rear catalyst 9 increases, the NOx trapping capacity of the rear catalyst 9 decreases.

Hence, the controller 6 estimates the SOx amount stored in the rear catalyst 9. When the estimated SOx amount exceeds a predetermined amount, the amount of unburnt fuel and oxygen flowing into the rear catalyst 9 is increased, the catalyst temperature is increased by the heat of combustion, and the accumulated SOx is discharged.

In addition, the controller 6 performs deterioration diagnosis of the front catalyst 8 based on the output of the $O_2$ sensors 10, 11.

Specifically, a primary diagnosis is first performed based on the number of inversions of the output of the $O_2$ sensor 11 in an interval during which the output of the front $O_2$ sensor 10 performs a predetermined number or inversions, so as to diagnose deterioration of the front catalyst 8.

Although the precision of this primary diagnosis is low, it can be performed even if the time for which deterioration diagnosis conditions are satisfied is short, and can therefore be performed even if there are not many diagnosis opportunities due to SOx discharge control or lean running.

When it is determined in the primary diagnosis that the front catalyst 8 has not deteriorated, fuel economy or emission purification performance is given priority, lean running or SOx discharge control is permitted, and these processes are performed under predetermined conditions.

On the other hand, when it is determined in the primary diagnosis that the front catalyst 8 has deteriorated, a secondary diagnosis is performed to precisely know the deterioration state of the front catalyst 8.

As the secondary diagnosis gives a precise diagnosis result, it requires correspondingly more time than the primary diagnosis, but as lean air-fuel ratio running and SOx discharge control are prohibited when it is determined that the front catalyst 8 has deteriorated in the primary diagnosis, many opportunities are available for the secondary diagnosis.

Hence, according to this invention, a simple primary diagnosis is first performed, and when it is determined in the primary diagnosis that the catalyst has deteriorated, lean air-fuel ratio running and SOx discharge control are prohibited, and the high precision secondary diagnosis is performed. Therefore, a precise deterioration diagnosis can be performed even when few diagnosis opportunities exist due to lean running or SOx discharge control. There is no need to reduce the lean running region or the SOx discharge control region to provide more diagnostic opportunities, and deterioration diagnosis can be performed together with lean air-fuel ratio running or SOx discharge control.

Figure 8:
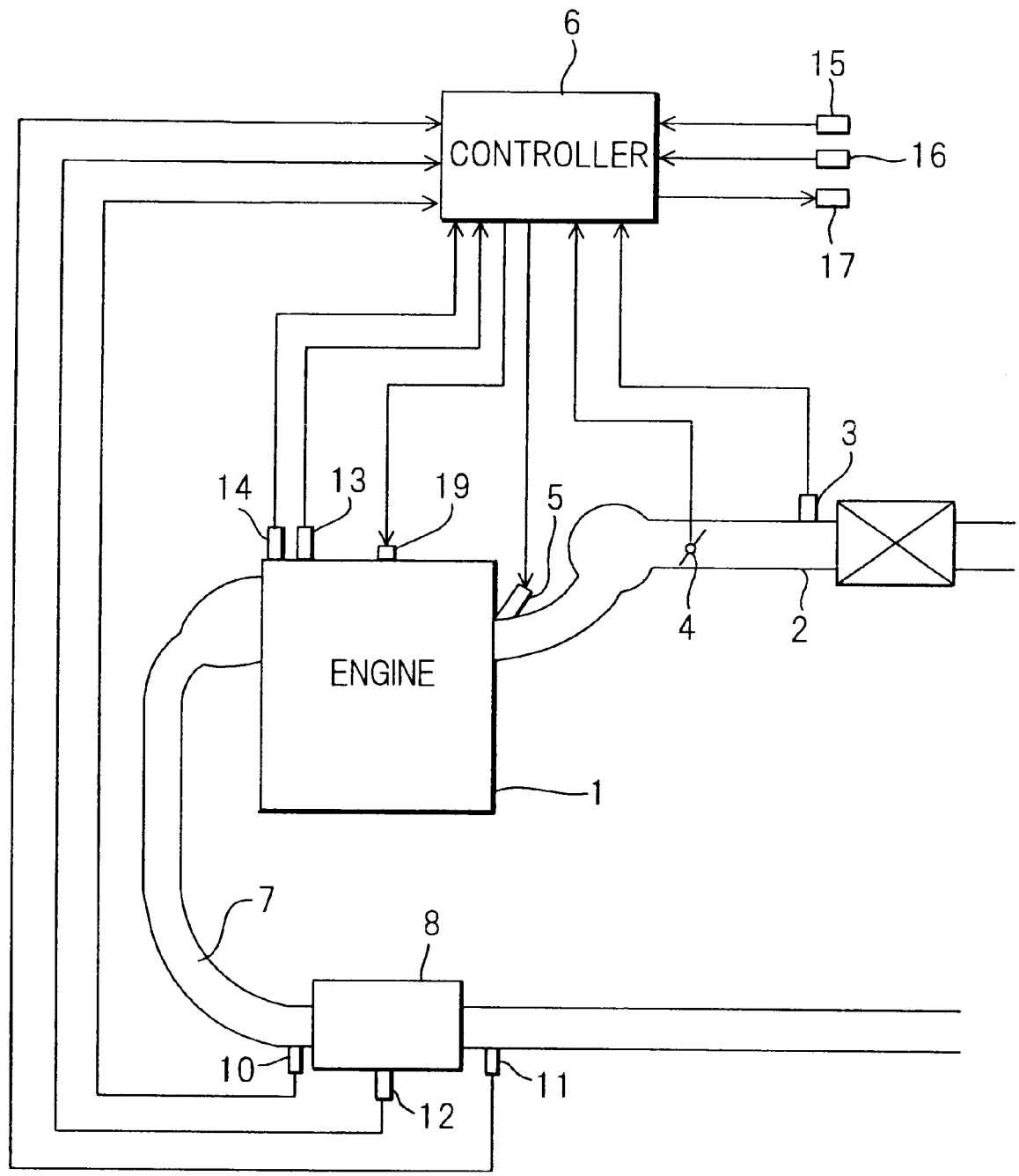
FIG. 8 is similar to FIG. 1, but showing a second embodiment of this invention.

This invention can also be applied to an arrangement where there is no rear catalyst 9, or where the role of trapping or discharging NOx is supported by the front catalyst 8 without the rear catalyst 9, as shown in FIG. 8.

Also, a linear air-fuel ratio sensor may be used instead of the $O_2$ sensor for detecting the air-fuel ratio of the exhaust gas.

Further, an NOx sensor can be installed which detects NOx concentration downstream of the rear catalyst 9, and determination of SOx discharge conditions performed based on the output of this NOx sensor. In this case, NOx trapping performance declines and the NOx concentration downstream of the catalyst increases the greater the SOx storage amount, so it is determined that SOx discharge conditions are satisfied when the NOx concentration exceeds a predetermined value.

Further, the same result is obtained by setting an overlapping area between the region surrounded by the dot-and-dash line in FIG. 3 and the stoichiometric air-fuel ratio running region as the diagnosis region until it is diagnosed in the primary diagnosis that the front catalyst 8 has deteriorated, and then enlarging the diagnosis region to the whole area surrounded by the dot-and-dash line after it is diagnosed in the primary diagnosis that the front catalyst 8 deteriorated and performing stoichiometric air-fuel ratio running forcibly in the diagnosis region.

In this case, even if the three-way catalyst is diagnosed in the primary diagnosis as having deteriorated and the diagnosis region is enlarged, if it is determined in the secondary diagnosis that the three-way catalyst has not deteriorated, the enlargement of the diagnosis region is canceled.

The entire contents of Japanese Patent Application P11-81621 (filed Mar. 25, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. An exhaust emission control device of an engine, comprising:

an exhaust pipe, a front three-way catalyst provided in the exhaust pipe, a rear catalyst provided downstream of the front three-way catalyst which traps or reduces NOx according to an air-fuel ratio of the inflowing exhaust gas, a sensor which detects the air-fuel ratio of the exhaust gas downstream of the front three-way catalyst, a sensor which detect the running state of the engine, and a microprocessor programmed to:

determine whether or not conditions are satisfied for discharging SOx stored in the rear catalyst, perform SOx discharge control of the rear catalyst when conditions are satisfied for discharging SOx and the running state of the engine is within an SOx discharge running region, cause the air-fuel ratio of the engine to fluctuate periodically between rich and lean around the stoichiometric air-fuel ratio when the running state of the engine is in a catalyst diagnosis region whereof part overlaps with the SOx discharge running region, perform a primary diagnosis of whether or not the front three-way catalyst has deteriorated based on the air-fuel ratio of the exhaust gas downstream of the front three-way catalyst detected in a first period each time the first period elapses when the engine is running in the diagnosis region, perform a secondary diagnosis of whether or not the front three-way catalyst has deteriorated based on the air-fuel ratio of the exhaust gas downstream of the front three-way catalyst detected in a second period longer than the first period each time the second period elapses when the engine is running in the diagnosis region, prohibit the primary diagnosis and secondary diagnosis when SOx discharge control is performed, and prohibit SOx discharge control when it is diagnosed that the front three-way catalyst has deteriorated in the primary diagnosis.

2. An exhaust emission control device of an engine, comprising:

an exhaust pipe, a three-way catalyst provided in the exhaust pipe which traps or reduces NOx according to an air-fuel ratio of the inflowing exhaust gas, a sensor which detects the air-fuel ratio of the exhaust gas downstream of the three-way catalyst, a sensor which detect the running state of the engine, and a microprocessor programmed to:

determine whether or not conditions are satisfied for discharging SOx stored in the three-way catalyst, perform SOx discharge control of the three-way catalyst when conditions are satisfied for discharging SOx and the running state of the engine is within a SOx discharge running region, cause the air-fuel ratio of the engine to fluctuate periodically between rich and lean around the stoichiometric air-fuel ratio when the running state of the engine is in a catalyst diagnosis region whereof part overlaps with the SOx discharge running region, perform a primary diagnosis of whether or not the three-way catalyst has deteriorated based on the air-fuel ratio of the exhaust gas downstream of the three-way catalyst detected in a first period each time the first period elapses when the engine is running in the diagnosis region, perform a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region, prohibit the primary diagnosis and secondary diagnosis when SOx discharge control is performed, and prohibit SOx discharge control when it is diagnosed that the three-way catalyst has deteriorated in the primary diagnosis.

3. An exhaust emission control device as defined in claim 1, wherein the microprocessor is further programmed to:

cancel the prohibition of SOx discharge control when it is determined in the secondary diagnosis that the three-way catalyst has not deteriorated.

4. An exhaust emission control device of an engine, comprising:

an exhaust pipe, a three-way catalyst provided in the exhaust pipe, a sensor which detects the air-fuel ratio of the exhaust gas downstream of the three-way catalyst, a sensor which detect the running state of the engine, and a microprocessor programmed to:

control the air-fuel ratio of the engine to a lean value when the running state of the engine is in a lean air-fuel ratio running region, cause the air-fuel ratio of the engine to fluctuate periodically between rich and lean around the stoichiometric air-fuel ratio when the running state of the engine is in a catalyst diagnosis region and lean air-fuel ratio control is not being performed, perform a primary diagnosis of whether or not the three-way catalyst as deteriorated based on the air-fuel ratio of the exhaust gas downstream of the three-way catalyst detected in a first period each time the first period elapses when the engine is running in the diagnosis region, perform a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region, prohibit the primary diagnosis and secondary diagnosis when lean air-fuel ratio control is performed, and prohibit lean air-fuel ratio control when it is diagnosed that the three-way catalyst has deteriorated in the primary diagnosis.

5. An exhaust emission control device as defined in claim 4, wherein the microprocessor is further programmed to:

cancel the prohibition of lean air-fuel ratio control when it is determined in the secondary diagnosis that the three-way catalyst has not deteriorated.

6. An exhaust emission control device of an engine, comprising:

an exhaust pipe, a three-way catalyst provided in the exhaust pipe, a sensor which detects the air-fuel ratio of the exhaust gas downstream of the three-way catalyst, a sensor which detect the running state of the engine, and a microprocessor programmed to:

control the air-fuel ratio of the engine to a lean air-fuel ratio when the running state of the engine is in a lean air-fuel ratio running region, cause the air-fuel ratio of the engine to fluctuate periodically between rich and lean around the stoichiometric air-fuel ratio with preference to lean air-fuel ratio control when the running state of the engine is in a catalyst diagnosis region, perform a primary diagnosis of whether or not the three-way catalyst has deteriorated based on the air-fuel ratio of the exhaust gas downstream of the three-way catalyst detected in a first period each time the first period elapses when the engine is running in the diagnosis region, perform a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region, and set the diagnosis region outside the lean air-fuel ratio running region until it is determined in the primary diagnosis that the front catalyst has deteriorated, and after it is diagnosed as having deteriorated, enlarge the diagnosis region to a region overlapping with the lean air-fuel ratio running region.

7. An exhaust emission control device as defined in claim 6, wherein the microprocessor is further programmed to:

cancel the enlargement of the diagnosis region when it is determined in the secondary diagnosis that the three-way catalyst has not deteriorated.

8. An exhaust emission control device of an engine, comprising:

an exhaust pipe, a front three-way catalyst provided in the exhaust pipe, a rear catalyst provided downstream of the front three-way catalyst which traps or reduces NOx according to an air-fuel ratio of the inflowing exhaust gas, a sensor which detects the air-fuel ratio of the exhaust gas downstream of the front three-way catalyst, a sensor which detect the running state of the engine, and means for determining whether or not conditions are satisfied for discharging SOx stored in the rear catalyst, means for performing SOx discharge control of the rear catalyst when conditions are satisfied for discharging SOx and the running state of the engine is within an SOx discharge running region, means for causing the air-fuel ratio of the engine to fluctuate periodically between rich and lean around the stoichiometric air-fuel ratio when the running sate of the engine is in a catalyst diagnosis region whereof part overlaps with the SOx discharge running region, means for performing a primary diagnosis of whether or not the front three-way catalyst has deteriorated based on the air-fuel ratio of the exhaust gas downstream of the front three-way catalyst detected in a first period each time the first period elapses when the engine is running in the diagnosis region, means for performing a secondary diagnosis of whether or not the front three-way catalyst has deteriorated based on the air-fuel ratio of the exhaust gas downstream of the front three-way catalyst detected in a second period longer than the first period each time the second period elapses when the engine is running in the diagnosis region, means for prohibiting the primary diagnosis and secondary diagnosis when SOx discharge control is performed, and means for prohibiting SOx discharge control when it is diagnosed that the front three-way catalyst has deteriorated in the primary diagnosis.

9. An exhaust emission control device of an engine, comprising:

an exhaust pipe, a three-way catalyst provided in the exhaust pipe which traps or reduces NOx according to an air-fuel ratio of the inflowing exhaust gas, means for detecting the air-fuel ratio of hte exhaust gas downstream of the three-way catalyst, means for detecting the running state of the engine, means for determining whether or not conditions are satisfied for discharging SOx stored in the three-way catalyst, means for performing SOx discharge control of the three-way catalyst when conditions are satisfied for discharging SOx and the running state of the engine is within a SOx discharge running region, means for causing the air-fuel ratio of the engine to fluctuate periodically between rich and lean around the stoichiometric air-fuel ratio when the running state of the engine is in a catalyst diagnosis region whereof part overlaps with the SOx discharge running region, means for performing a primary diagnosis of whether or not the three-way catalyst has deteriorated based on the air-fuel ratio of the exhaust gas downstream of the three-way catalyst detected in a first period each time the first period elapses when the engine is running in the diagnosis region, means for performing a secondary diagnosis of whether or not the front three-way catalyst has deteriorated based on the air-fuel ratio of the exhaust gas downstream of the three-way catalyst detected in a second period longer than the first period each time the second period elapses when the engine is running in the diagnosis region, means for prohibiting the primary diagnosis and secondary diagnosis when SOx discharge control is performed, and means for prohibiting SOx discharge control when it is diagnosed that the three-way catalyst has deteriorated in the primary diagnosis.

10. An exhaust emission control device of an engine, comprising:

an exhaust pipe, a three-way catalyst provided in the exhaust pipe, means for detecting the air-fuel ratio of the exhaust gas downstream of the three-way catalyst, means for detecting the running state of the engine, means for controlling the air-fuel ratio of the engine to a lean value when the running state of the engine is in a lean air-fuel ratio running region, means for causing the air-fuel ratio of the engine to fluctuate periodically between rich and lean around the stoichiometric air-fuel ratio when the running state of the engine is in a catalyst diagnosis region and lean air-fuel ratio control is not being performed, means for performing a primary diagnosis of whether or not the three-way catalyst has deteriorated based on the air-fuel ratio of the exhaust gas downstream of the three-way catalyst detected in a first period each time the first period elapses when the engine is running in the diagnosis region, means for performing a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region, means for prohibiting the primary diagnosis and secondary diagnosis when lean air-fuel control is performed, and means for prohibiting lean air-fuel control when it is diagnosed that the three-way catalyst has deteriorated in the primary diagnosis.

11. An exhaust emission control device of an engine, comprising:

an exhaust pipe, a three-way catalyst provided in the exhaust pipe, means for detecting the air-fuel ratio of the exhaust gas downstream of the three-way catalyst, means for detecting the running state of the engine, means for controlling the air-fuel ratio of the engine to a lean air-fuel ratio when the running state of the engine is in a lean air-fuel ratio running region, means for causing the air-fuel ratio of the engine to fluctuate periodically between rich and lean around the stoichiometric air-fuel ratio with preference to lean air-fuel ratio control when the running state of the engine is in a catalyst diagnosis region, means for performing a primary diagnosis of whether or not the three-way catalyst has deteriorated based on the air-fuel ratio of the exhaust gas downstream of the three-way catalyst detected in a first period each time the first period elapses when the engine is running in the diagnosis region, means for performing a secondary diagnosis of whether or not the three-way catalyst has deteriorated based on the air-fuel ratio of the exhaust gas downstream of the three-way catalyst detected in a second period longer than the first period each time the second period elapses when the engine is running in the diagnosis region, and means for setting the diagnosis region outside the lean air-fuel ratio running region until it is determined in the primary diagnosis that the front catalyst has deteriorated, and after it is diagnosed as having deteriorated, enlarging the diagnosis region to a region overlapping with the lean air-fuel ratio running region.

* * * * *